Feb. 6, 1968  A. PICKAVANCE ET AL  3,367,763
APPARATUS FOR PRESS BENDING AND TOUGHENING A SHEET OF GLASS
Filed July 7, 1964  2 Sheets-Sheet 1

Inventors
Alan Pickavance
Ronald Charles Freestone
By
Morrison, Kennedy & Campbell
Attorneys United States Patent Office 3,367,763
Patented Feb. 6, 1968

3,367,763
APPARATUS FOR PRESS BENDING AND
TOUGHENING A SHEET OF GLASS
Alan Pickavance, St. Helens, and Ronald Charles Freestone, Eccleston, St. Helens, England, assignors to Pilkington Brothers Limited, Liverpool, England, a corporation of Great Britain
Filed July 7, 1964, Ser. No. 380,778
Claims priority, application Great Britain, July 8, 1963, 26,988/63
2 Claims. (Cl. 65—287)

ABSTRACT OF THE DISCLOSURE

Apparatus for bending and toughening a vertically-supported heated flat glass between a pair of quenching means, which comprises a pair of bending dies at least one of which comprises a thin metal sheet and both of which are arranged for movement with a minimum of inertia toward and away from each other and thereafter out of position between the quenching means.

---

Figure 1:
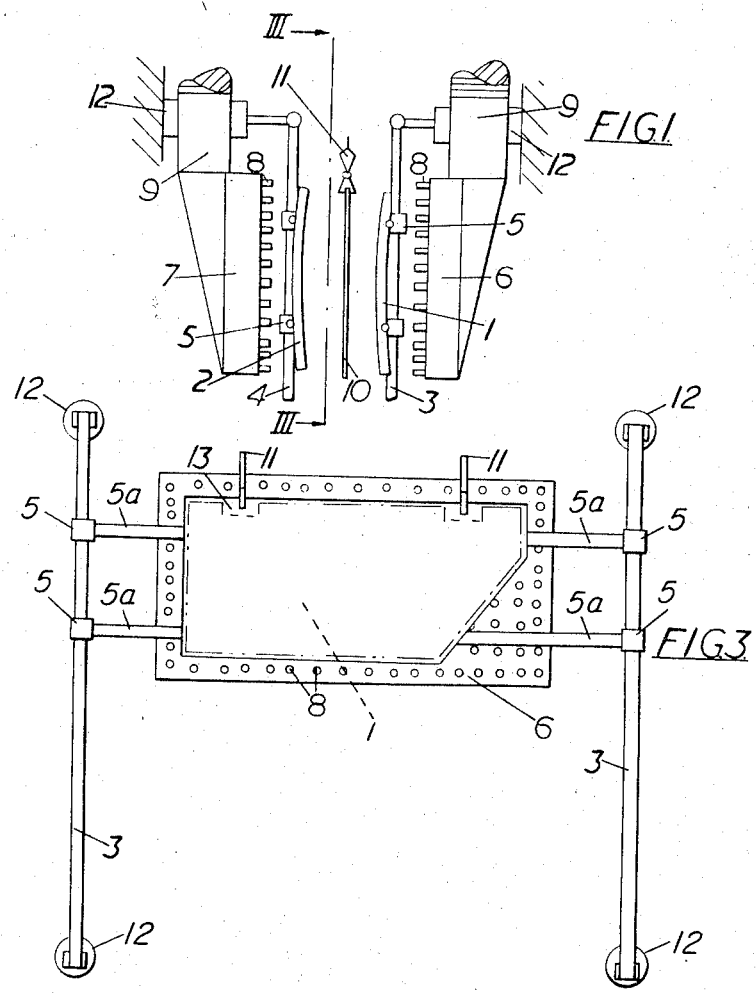

This invention relates to apparatus for and methods of bending and toughening a sheet of glass.

Generally speaking, there are two methods of manufacturing bent and toughened glass. In one method the glass is supported on a horizontal frame and the bending is effected by heat treatment on the glass which causes the glass to sag onto the configuration of the frame and conform to that configuration. The glass on the frame is then subjected to quenching jets to complete the toughening operation. The alternative procedure is well known in which the glass to be bent is held vertically, usually by suspension, between complementary bending dies. In this arrangement the glass, suspended in a vertical plane is withdrawn from the furnace to be in the path of advance of complementary dies which are then applied to the surfaces of the glass to make the glass conform to the configuration of the dies, and the bent glass is subjected to the action of quenching jets.

It is a main object of the present invention to provide an improvement in this latter method and to provide improved apparatus for bending and toughening glass in sheet form.

According to the present invention there is provided apparatus for bending and toughening a sheet of glass comprising, in combination, complementary bending dies mounted to be advanced to a heated sheet of glass vertically supported therebetween to make the glass conform to the configuration of the dies and to be moved away from the glass, at least one of said dies having a continuous surface and both said dies being shallow in thickness and having a low inertia, and quenching means located in position close behind the respective complementary dies for operation immediately the dies are moved out of the trajectories of quenching streams therefrom to permit successively bending and toughening of the glass without moving the glass.

In accordance with the present invention, the thickness of the dies is made as small as is consistent with the necessity to obtain the desired conformation of the vertical glass sheet and the shallow dies consequently have a low inertia which enables them to be moved quickly to effect the bending of the glass sheet and then to be moved quickly away from the glass and out of the trajectories of quenching streams from the quenching jets. The shallow nature of the dies also has the advantage that the quenching jets which are located close behind the position from which the dies are advanced to effect bending are sufficiently close to the glass sheet for quenching to commence from them immediately that their trajectories cease to be impeded by the bending dies; the space occupied by the bending dies is thereby a practical minimum.

By the use of the present invention the time which elapses between the removal of the glass sheet from the furnace to the commencement of quenching by the quenching streams from the quenching means may be considerably reduced, and this reduction in the time interval becomes of increasing importance as the thickness of the glass sheet being toughened is reduced.

For instance with ⅜" thick glass satisfactory results are obtained with a period of 30 seconds elapsing; with ¼" glass 20 seconds; with ³⁄₁₆" glass 13 seconds and with ⁵⁄₃₂" glass not more than 9 seconds may elapse, since the temperature of thinner glasses falls more rapidly than of thick ones.

Attempts to lengthen the time available between the removal of the glass sheet from the furnace and the commencement of quenching by raising the glass sheet to a higher temperature before its removal from the furnace have not been successful because the effects of the method of supporting the glass (whether this is done using tongs or by resting the bottom edge of the glass sheet on a support) have become too prominent.

The reduction in the time elapsing between the removal of the glass sheet from the furnace and the commencement of quenching which is achieved using apparatus according to the present invention may be employed in conserving heat energy by reducing the temperature to which the glass sheet is raised when the glass sheet is thick, for example ¼" in thickness or even when the glass sheet is ³⁄₁₆" in thickness. However, the invention has particular application for bending and toughening a thin sheet of glass and enabling a high degree of toughening to be obtained in such a thin sheet of glass.

According to this aspect, therefore, the present invention provides apparatus for bending and toughening a sheet of glass (for example a thin sheet of glass having a thickness of ⁵⁄₃₂" or less), comprising, in combination, complementary bending dies, both said dies being of minimum thickness and having a low inertia, and at least the male die having a continuous surface, means for advancing said dies to a suspended sheet of glass to make the flat glass conform to the configuration of the dies and for retracting said dies from the glass, means for displacing said dies from a normal or retracted position in a plane substantially parallel to the suspended sheet of glass, and quenching means located close behind the normal or retracted position of the respective complementary dies for quenching the conformed glass sheet, whereby the glass sheet is successively bent and toughened without moving the glass sheet.

Preferably the complementary bending dies are mounted to be retracted from the glass and then to be removed vertically out of the trajectories of the quenching streams and advantageously the quenching means are arranged to be moved in oscillatory movement, for example a circular movement of small amplitude, in order to spread the quenching medium, which is usually air, over the surface of the glass sheet being toughened.

Desirably the bending dies comprise light metal frames curved on their opposing faces to the contour of and slightly less in size than the desired curved glass sheet and each having a thickness of 2" or less. The operative face of the convex die frame is covered with a thin curved metal sheet extending over its whole face, but that of the concave die is preferably provided with a flat surface about ⅜" wide contacting only the marginal portion of the glass to be bent. Both frames and operative facings will be notched along their upper edges to accommodate the tongs by which the glass is suspended and both will be covered in known manner to prevent direct contact between the metal and the hot glass. Such dies are of very light construction and may be rapidly moved both towards and away from the glass for the bending operation, and especially transversely of the glass to remove them from the trajectories of the quenching streams.

By the use of the present invention, and particularly when very thin dies are employed for the treatment of thin sheets of glass, quenching commences immediately the dies are moved out of the trajectories of the quenching streams either by a sideways or a vertical movement because the quenching means is arranged close behind the rear faces of the dies.

In a preferred embodiment of the invention, means is provided for withdrawing the glass sheet horizontally from the furnace into a position wherein the glass is both bent and quenched and the bending dies are moved vertically downwards after being retracted from the bending operation.

The present invention also comprehends a method of bending and toughening a sheet of glass comprising supporting a heated glass sheet in a vertical position, conforming the heated glass sheet to the configuration of thin complementary bending dies of low inertia, at least one of which has a continuous surface, moving said dies out of the trajectories of quenching streams from quenching jets, and quenching said heated conformed sheet by quenching streams from said quenching jets to effect successively bending and toughening of the glass without moving the glass, whereby the heat loss from the glass prior to the commencing of the quenching action is kept to a practical minimum.

Figure 2:
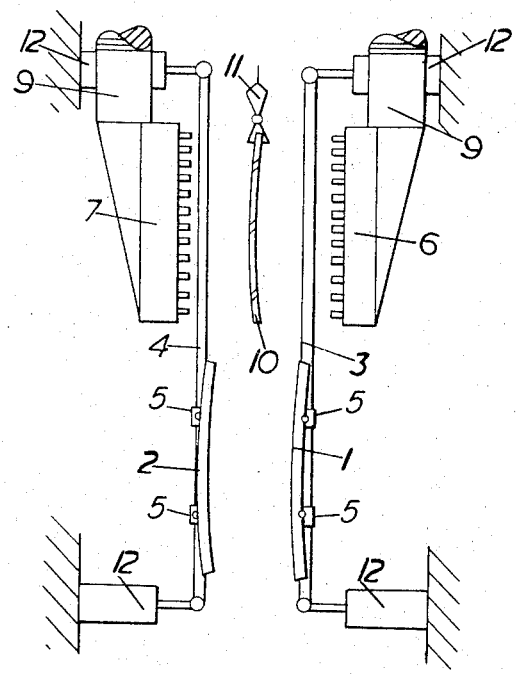

In order that the invention may be more clearly understood, a preferred arrangement in accordance therewith will be described by way of example, with reference to the accompanying diagrammatic drawings in which:

FIGURE 1 shows a side view of apparatus according to the invention with bending dies in position for advance to a heated glass sheet suspended therebetween, FIGURE 2 shows the apparatus of FIGURE 1 after the bending operation and with the bending dies displaced to permit quenching of the bent glass sheet, and FIGURE 3 is a view of part of the apparatus of FIGURE 1, taken along the lines III—III.

In the drawings, like reference numerals designate the same or similar parts.

Referring to the drawings there are shown complementary bending dies comprising a male die 1 and a female die 2 which are slidably mounted on respective rails 3 and 4 by appropriate means 5 from which horizontal bars 5a extend. The male die is a curved metal sheet about ⅛" thick mounted on a frame contoured to the curvature desired in the glass sheet, the frame on which the metal sheet is mounted is about 1" to 1½" in thickness, and the surface of the metal sheet comprising the male die 1 is covered with a glass silk covering.

The female die 2 comprises a peripheral frame about 1" thick having a flange about ⅜" wide on its operative face. This face is similarly contoured to the corresponding portion of the male die 1 and is similarly covered with a glass silk covering.

Located close behind the dies 1 and 2 are air boxes 6 and 7 having in their faces jets 8 for delivering a gaseous and chilling medium which is conveniently air at ambient temperature. The air is supplied to the air boxes 6 and 7 through ducting 9 from an appropriate pressure source (not shown).

In operation the glass sheet 10 is suspended by tongs 11 in known manner and heated in an electric furnace. When the glass sheet 10 has reached a temperature near the softening point of the glass, namely about 700° C., the heated glass sheet 10 on its tongs 11 is removed in a horizontal path from the furnace to the position shown in FIGURE 1 between the complementary bending dies 1 and 2.

As the tongs carrying the heated glass sheet 10 come to rest in the position shown in FIGURE 1, the rails 3 and 4 on which the dies 1 and 2 are mounted are advanced by the advancing means 12 to bring the dies 1 and 2 into pressure contact with the heated glass sheet 10 to effect the bending operation.

The bending dies 1 and 2 are recessed at 13 as shown in FIGURE 3 in order to accommodate the tongs 11 by which the heated glass sheet 10 is suspended.

The complementary bending dies 1 and 2 are immediately retracted by the means 12 to the normal or retracted position shown in FIGURE 1 and then the complementary bending dies are caused to slide vertically downwards along the rails 3 and 4 by means not shown so that the dies 1 and 2 are moved out of the trajectories of quenching streams from the quenching jets 8. Air under pressure is supplied to the air boxes 6 and 7 as soon as the male and female dies 1 and 2 have been displaced downwards, so that the quenching streams from the quenching jets 8 fall on both sides of the bent glass sheet 10 shown in FIGURE 2.

By utilising the method according to the invention, it is possible to commenec quenching of the glass sheet within six seconds of the glass emerging from the furnace and a satisfactorily high degree of toughening can then be imparted to glass of a thickness of $\frac{5}{32}$" or even less.

In particular the use of a thin die enables quick movement of the dies to take place during the bending operation and during their removal from between the quenching jets so that there is a minimum heat loss from the glass sheet. In this way the temperature drop during the quenching operation is maintained at a maximum and the greatest degrees of toughening are obtained in the glass sheet. Also the apparatus of the present invention is slight as compared with the ponderous equipment already known in industry and the movements of the die members in the present invention to the glass and away from it and subsequently from between the quenching jets are greatly expedited.

Furthermore, as already indicated, the use of thin dies enables the nozzles of quenching jets to be positioned in subtsantially operative locations immediately behind the dies. However, if desired, a small movement of the air boxes towards the bent glass sheet may be made at the same time as the dies are displaced. This movement would be of the order of 2 inches.

In this specification the term "trajectories" is used in relation to the quenching jets to denote the paths which quenching streams from the jets follow when the quenching operation is in progress.

We claim:
1. Apparatus for bending and toughening a glass sheet wherein the glass is stationary during the bending and toughening operations, comprising a pair of quenching means, means for bending a sheet of heated glass while it is disposed between the quenching means, said bending means comprising a pair of frameworks providing bending elements which have complementary contours corresponding to the curvature intended to be imposed on the heated glass and at least one of which comprises a bent glass-bending metal sheet element and providing also a pair of rails spaced apart laterally a greater distance than the width of the quenching means, each framework embodying parallel horizontal bars respectively connected to said rails in sliding relation for the displacement of respective ones of said elements along the respective rails, means for simultaneously and horizontally moving the opposed frameworks toward each other to bend the glass, and means for actuating the quenching means after the metal sheet element is displaced on its respective rails out of location between the quenching means and the glass.

2. Apparatus according to claim 1 wherein a pair of horizontal bars on each framework is connected by a light frame of a form to correspond to the continuous peripheral area of the glass to be bent and one of the frames carries the metal sheet element for application of the sheet of glass to the metal sheet element by the frame on the complementary pair of horizontal bars when the two frameworks are moved toward each other in a horizontal direction.

References Cited

UNITED STATES PATENTS

| 2,347,382 | 4/1944 | White | 65—273 X |
| 2,536,905 | 1/1951 | Bird et al. | 65—348 X |

FOREIGN PATENTS 613,040   1/1961   Canada.

DONALL H. SYLVESTER, *Primary Examiner.*

S. L. BASHORE, *Examiner.*

A. D. KELLOGG, *Assistant Examiner.*